UNITED STATES PATENT OFFICE.

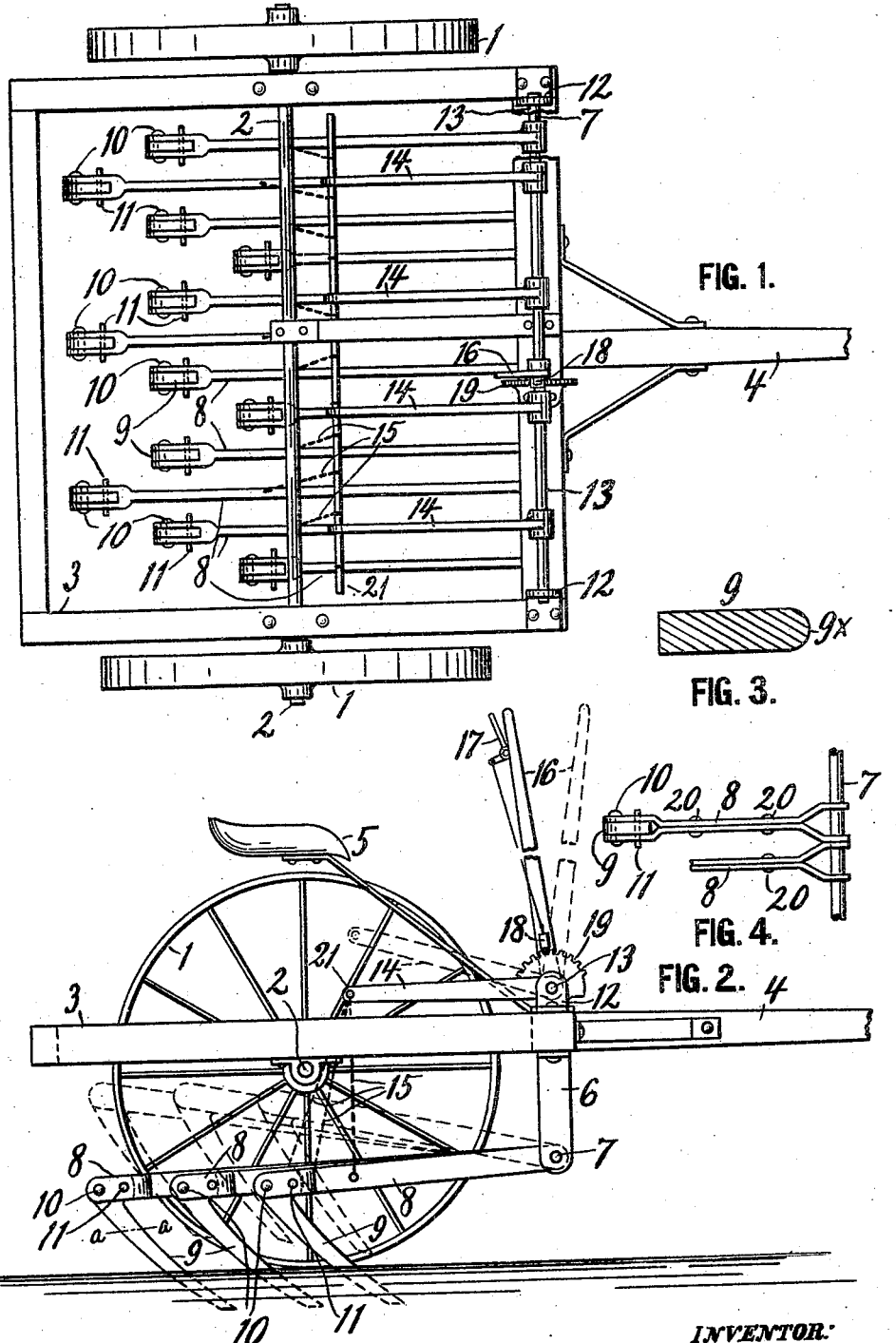

JAMES HOPKINS, OF BOARDMAN, WISCONSIN.

QUACK-GRASS DIGGER.

942,559.  Specification of Letters Patent.  Patented Dec. 7, 1909.

Application filed December 7, 1908. Serial No. 466,243.

*To all whom it may concern:*

Be it known that I, JAMES HOPKINS, a citizen of the United States, residing at Boardman, in the county of St. Croix and State of Wisconsin, have invented a new and useful Quack-Grass Digger, of which the following is a specification.

My invention relates to improvements in agricultural machinery, and the main object is to provide an efficient device for uprooting and destroying the so-called "quack-grass", "Johnson grass" and other similar weeds.

With this end in view I construct a kind of wheeled sulky frame adapted to be drawn by horses, and pivot in such frame a series of bars, each provided with a tooth of such peculiar shape that it will not cut the roots of the weeds nor gather the weeds into large obstructive heaps, but simply raise the roots out of the ground and let them wither and die in the sun.

In the drawing, Figure 1 is a top or plan view of my improved quack grass digger with the driver's seat removed from its supporting arm. Fig. 2 is a side elevation of the machine with one supporting wheel removed, and Fig. 3 is an enlarged cross section of one of the digging teeth, as on line $a$—$a$ in Fig. 2. Fig. 4 is a top view of a portion of the shaft 7 and two of the bars 8 in their preferred form.

Referring to the drawing by reference numerals, 1 designates a pair of supporting wheels journaled on the ends of an axle 2, which supports a frame 3, having a pole 4, by which horses or other draft animals may draw and steer the machine. The frame may also have a driver's seat 5 as shown in Fig. 2. In brackets 6 depending from the front end of the frame is fixed a rod 7 on which are pivoted the front ends of a series of bars 8, which are of various lengths and each provided with a steel tooth 9, which is secured to the bar by a pivot 10 and a breakable pin 11, so that if the tooth strikes a rock or other obstruction in the ground the pin 11 will break and let the tooth incline rearwardly until a new pin can be provided. Normally each tooth is inclined with its point forward to make it engage easily in the ground. It will be observed that each tooth is made of a flat bar of steel and thus of even thickness, and has its forward edge rounded off to about a half circle, as shown at 9× in Fig. 3. It is this peculiar though simple form of the inclined tooth that pulls or impels the roots of the weeds upward out of the ground, and causes them to roll off to one side or the other of the tooth in handfuls, and not accumulate into large obstructive heaps, but to remain so spread on the ground that both roots and weeds on them will quickly die and may then be removed if so desired.

To enable the driver to raise and lower the bars 8, I provide upon the front end of the frame, in brackets 12, a rock shaft 13, on which are fixed arms 14, whose rear ends carry a rod 21, connected by chains 15 to the bars 8, so as to raise and lower the latter by rocking the shaft. The shaft is rocked and held in various turned positions by a lever 16 fixed on it and provided with a finger-lever 17, controlling a latch 18 which engages a toothed sector 19 fixed on the frame-work.

In the modification or preferred form, Fig. 4, the bars 8 are each made up of two flat iron bars secured together by rivets 20 and spread apart at the ends, so as to insert the tooth 9 between their rear ends, while the front ends are spread sufficiently to form inclined braces to the bar and at the same time reach the next bar on the shaft, and thereby prevent sliding movement of the bars on said shaft.

Having thus described my invention, what I claim is:

1. A device of the class described having teeth, each normally occupying a forwardly inclined position with its point and being flat, solid and of even thickness in cross section all along from end to end and arranged to move edgewise in the soil, the forward weed digging edge of the tooth being rounded so as to impel the roots of weeds upwardly without cutting them to pieces.

2. A tooth for uprooting weeds, the same constituting a flat solid bar adapted to move edgewise in the ground while standing at an incline with its lower end forward, the front weed digging edge of the tooth being rounded, substantially as and for the purpose set forth, said tooth being of practically the same thickness throughout its entire length.

In testimony whereof I affix my signature, in presence of two witnesses.

JAMES HOPKINS.

Witnesses:
EMMA A. KIBBE,
F. B. FINNEGAN.